(12) United States Patent
Won

(10) Patent No.: US 12,228,672 B2
(45) Date of Patent: Feb. 18, 2025

(54) DEVICE AND METHOD FOR DETECTING BLOCKAGE OF RADAR SENSOR, AND RADAR APPARATUS

(71) Applicant: HL KLEMOVE CORP., Incheon (KR)

(72) Inventor: GiYeon Won, Gyeonggi-do (KR)

(73) Assignee: HL KLEMOVE CORP., Incheon (KR)

( * ) Notice: Subject to any disclaimer, the term of this patent is extended or adjusted under 35 U.S.C. 154(b) by 473 days.

(21) Appl. No.: 17/542,401

(22) Filed: Dec. 4, 2021

(65) Prior Publication Data

US 2022/0187414 A1 Jun. 16, 2022

(30) Foreign Application Priority Data

Dec. 15, 2020 (KR) .......................... 10-2020-0175069

(51) Int. Cl.
| | |
|---|---|
| *G01S 13/86* | (2006.01) |
| *B60W 40/02* | (2006.01) |
| *G01S 7/02* | (2006.01) |
| *G01S 7/40* | (2006.01) |
| *G01S 13/931* | (2020.01) |
| *G01W 1/02* | (2006.01) |
| *H04N 7/18* | (2006.01) |

(52) U.S. Cl.
CPC ............ *G01S 7/021* (2013.01); *G01S 13/867* (2013.01); *G01S 13/931* (2013.01); *G01S 2013/9322* (2020.01)

(58) Field of Classification Search
CPC ...... G01S 7/021; G01S 13/867; G01S 13/931; G01S 2013/9322; G01S 7/4039; G01S 7/4004; G01S 7/4052; G01S 7/40; B60W 40/02; B60W 2420/403; B60W 2420/408; B60W 2555/20; B60W 2720/26; G01W 1/02; H04N 7/18
USPC .......................................................... 342/70
See application file for complete search history.

(56) References Cited

U.S. PATENT DOCUMENTS

| | | | | |
|---|---|---|---|---|
| 2017/0358204 | A1* | 12/2017 | Modica | H04W 4/021 |
| 2020/0353942 | A1* | 11/2020 | Abt | G01S 13/931 |
| 2021/0370938 | A1* | 12/2021 | Fent | B60Q 1/08 |
| 2022/0187414 | A1* | 6/2022 | Won | G01S 7/4039 |

FOREIGN PATENT DOCUMENTS

| | | | | |
|---|---|---|---|---|
| EP | 3364210 B1 | * 10/2020 | ........... | G01S 13/867 |
| KR | 20190026678 A | * 3/2019 | ........... | G01S 13/931 |
| KR | 20200107487 A | * 3/2019 | ........... | G01S 13/931 |

* cited by examiner

*Primary Examiner* — Vladimir Magloire
*Assistant Examiner* — Remash R Guyah
(74) *Attorney, Agent, or Firm* — WOMBLE BOND DICKINSON (US) LLP

(57) ABSTRACT

The present invention relates to devices and methods for detecting the blockage of a radar sensor, and radar apparatuses. The radar sensor blockage detection device may include a first determiner for determining an external environment state based on at least one of external weather data, external image data, and vehicle status data, and determining detection sensitivity according to a result of the determined external environmental state, and a second determiner for determining whether the radar sensor is blocked based on a result of the determined detection sensitivity and signal data of the radar sensor.

18 Claims, 13 Drawing Sheets

DEVICE AND METHOD FOR DETECTING BLOCKAGE OF RADAR SENSOR, AND RADAR APPARATUS

CROSS-REFERENCE TO RELATED APPLICATION

This application claims the priority benefit of Republic of Korea Patent Application No. 10-2020-0175069, filed on Dec. 15, 2020 in the Korean Intellectual Property Office, the disclosure of which is incorporated herein by reference in its entirety.

BACKGROUND

Field of the Disclosure

The present disclosure relates to devices and methods for detecting the blockage of a radar sensor, and radar apparatuses.

Description of the Background

Recently, various devices for assisting a driver in driving a vehicle or for autonomous driving have been commercialized or developed. According to this trend, radar apparatuses mounted on vehicles are used to assist the operation of the vehicle by detecting objects around the vehicle and providing related information.

When debris or obstructions are present in front or the vicinity of the radar apparatus, the radar apparatus may be blocked, thereby resulting in the accuracy and reliability of the radar apparatus being reduced.

It is therefore desirable to provide devices or methods capable of improving the accuracy and reliability of the radar apparatus.

SUMMARY

To address these issues, embodiments of the present disclosure provide devices capable of detecting the blockage of a radar sensor for improving the accuracy and reliability of a radar apparatus.

Further, embodiments of the present disclosure provide methods capable of detecting the blockage of a radar sensor for improving the accuracy and reliability of a radar apparatus.

Further, embodiments of the present disclosure provide radar apparatuses with improved accuracy and reliability.

According to one aspect of the present disclosure, a device for detecting the blockage of a radar sensor is provided that includes: a first determiner for determining an external environment state based on at least one of external weather data, external image data, and vehicle status data, and determining detection sensitivity according to the determined external environmental state; and a second determiner for determining whether the radar sensor is blocked based on the determined detection sensitivity and signal data of the radar sensor.

According to another aspect of the present disclosure, a method of detecting the blockage of a radar sensor is provided that includes: determining an external environment state based on at least one of external weather data, external image data, and vehicle status data; determining detection sensitivity according to the determined external environmental state; and determining whether the radar sensor is blocked based on the determined detection sensitivity and signal data of the radar sensor.

According to further another aspect of the present disclosure, a radar apparatus is provided that includes: a radar sensor for transmitting and receiving a radar signal; a data acquirer for acquiring at least one of external weather data, external image data, and vehicle status data; and a controller for determining an external environment state based on the at least one of the external weather data, the external image data, and the vehicle status data, determining detection sensitivity according to the determined external environment state, and determining whether the radar sensor is blocked based on the determined detection sensitivity and signal data of the radar sensor.

According to embodiments of the present disclosure, it is possible to provide devices capable of detecting the blockage of a radar sensor for improving the accuracy and reliability of a radar apparatus.

Further, according to embodiments of the present disclosure, it is possible to provide methods capable of detecting the blockage of a radar sensor for improving the accuracy and reliability of a radar apparatus.

Further, according to embodiments of the present disclosure, it is possible to provide radar apparatuses with improved accuracy and reliability.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure. In the drawings.

DETAILED DESCRIPTION

Figure 1:
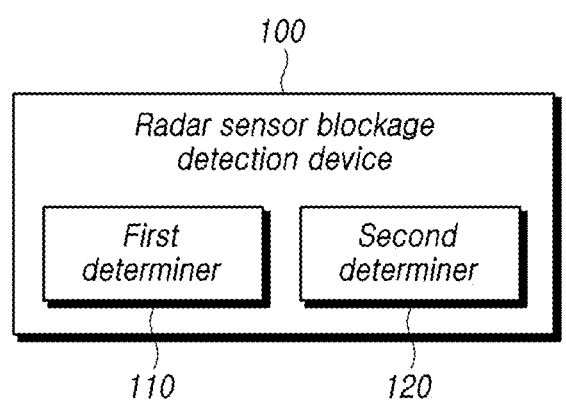
FIG. 1 is a block diagram illustrating a device for detecting the blockage of a radar sensor according to aspects of the present disclosure.

FIG. 1 is a block diagram illustrating a device for detecting the blockage of a radar sensor according to aspects of the present disclosure.

Referring to FIG. 1, the device 100 for detecting the blockage of a radar sensor ("radar sensor blockage detection device") according to aspects of the present disclosure may include at least one of a first determiner 110 and a second determiner 120. The first determiner 110 and the second determiner 120 may be connected by at least one of an electrical, magnetic, or mechanical connection.

The radar sensor blockage detection device 100 according to aspects of the present disclosure may include the first determiner 110 for determining an external environment state outside of a vehicle or a radar sensor based on at least one of external weather data, external image data, and vehicle status data, and determining detection sensitivity according to the determined external environmental state, and the second determiner 120 for determining whether the radar sensor is blocked based on the determined detection sensitivity and signal data of the radar sensor. Herein, the term "external" may refer to the outside of a vehicle on which the radar sensor blockage detection device 100 and/or a radar apparatus according to aspects of the present disclosure are mounted, or the outside of a radar sensor included in the radar apparatus and/or the radar apparatus according to aspects of the present disclosure.

The external weather data may include at least one of external temperature data, external rainfall data, and external snowfall data; however, embodiments of the present disclosure are not limited thereto. For example, any data that can represent a weather state outside of a vehicle or a radar sensor may be included in the external weather data.

The external image data may include external image data taken by a camera, an image sensor, etc.; however, embodiments of the present disclosure are not limited thereto. For example, any image data that include information on the outside of a vehicle or a radar sensor may be included in the external image data.

Here, the vehicle status data may include vehicle wheel slip data; however, embodiments of the present disclosure are not limited thereto. For example, any data that can represent a status of a vehicle may be included in the vehicle status data.

Hereinafter, a method of determining whether a radar sensor is blocked based on external weather data will be described.

The first determiner 110 can determine an external environment state outside of a vehicle or a radar sensor based on external weather data outside of the vehicle or the radar sensor.

The first determiner 110 can determine whether an external environment is at a temperature of below zero based on external temperature data, and can determine whether the external environment is under a wet/rainy condition based on external rainfall data.

The external temperature data may include temperature values outside of the vehicle or the radar sensor; however, embodiments of the present disclosure are not limited thereto. For example, any data related to temperature outside of the vehicle or the radar sensor may be included in the external temperature data.

The external rainfall data may include rainfall values outside of the vehicle or the radar sensor; however, embodiments of the present disclosure are not limited thereto. For example, any data related to rainfall outside of the vehicle or the radar sensor may be included in the external rainfall data.

In one embodiment, by comparing an external temperature value with a preset reference temperature value, the first determiner 110 can determine that a corresponding external environment is at a temperature of below zero when the external temperature value is smaller than or equal to the preset reference temperature value, and determine that the external environment is at a temperature of above zero when the external temperature value is greater than the preset reference temperature value.

In another embodiment, by comparing an external rainfall value with a preset reference rainfall value, the first determiner 110 can determine that a corresponding external environment is under a non-wet/rainy condition when the external rainfall value is smaller than or equal to the preset reference rainfall value, and determine that the external environment is under a wet/rainy condition when the external rainfall value is greater than the preset reference rainfall value.

Here, the preset reference temperature value and the reference rainfall value may be set to respective equal values regardless of a region in which the vehicle or the radar sensor is located; however, embodiments of the present disclosure are not limited thereto. For example, the preset reference temperature value and the reference rainfall value may be set to different values depending on regions in which the vehicle or the radar sensor is located.

The first determiner 110 can determine an external environment state of the vehicle or the radar sensor based on a result of the determination on whether the external environment is at the temperature of below zero and under the wet/rainy condition.

Specifically, the first determiner 110 can select at least one of a plurality of preset external environmental states based on the result of the determination on whether the external environment is at the temperature of below zero ("below-zero state") and under the wet/rainy condition ("rain state").

In one embodiment, the plurality of preset external environment states may include first and second external environment states.

In this case, in a situation where an external environment is in at least one of the below-zero state and the rain state, the first determiner 110 can select the first external environment state. Further, in a situation where the external environment is at a temperature of above zero ("above-zero state") and/or under a non-wet/rainy condition ("non-rain state"), the first determiner 110 can select the second external environment state.

In another embodiment, the plurality of preset external environment states may further include a third external environment state. That is, the plurality of preset external environment states may include the first to third external environment states.

In this case, in a situation where an external environment is in the below-zero state and the rain state, the first determiner 110 can select the first external environment state.

Further, while the first determiner 110 is allowed to select one of the second and third external environment states when the external environment is the above-zero state and the non-rain state, the first determiner 110 can select the second external environment state when the external environment is in an above-zero state exceeding a preset temperature value, and select the third external environment state when the external environment is in an above-zero state equal to or smaller than the preset temperature value.

That is, while the first determiner 110 is allowed to select one of the second and third external environment states when the external environment is the above-zero state and the non-rain state, the first determiner 110 can select the second external environment state when an external temperature value is greater than a preset first temperature value and is smaller than or equal to a preset second temperature value, and select the third external environment state when the external temperature value is greater than a preset reference temperature value and smaller than or equal to the preset first temperature value.

Here, the preset reference temperature value may be a temperature value that distinguishes between the above-zero state and the below-zero state of an external environment of a vehicle or a radar sensor. The preset first temperature value may be greater than the preset reference temperature value, and the preset second temperature value may be greater than the preset first temperature value.

The first determiner 110 can determine detection sensitivity according to a result of the determination on the external environment state.

Here, the detection sensitivity may refer to a criterion (or capability, scale, level, etc.) for discerning the blockage of a radar sensor. The detection sensitivity may include a detection threshold, a detection threshold range, and the like; however, embodiments of the present disclosure are not limited thereto. For example, any value, range, level, and the like capable of discerning the blockage of the radar sensor may be also included in the detection sensitivity.

The first determiner 110 can determine a detection threshold according to the result of the determination on the external environment state.

In one embodiment, the first determiner 110 can determine a first detection threshold when selecting the first external environment state, and determine a second detection threshold when selecting the second external environment state.

Here, the first detection threshold may be over a preset reference detection threshold, and the second detection threshold may be under the preset reference detection threshold. In other words, the first detection threshold may be greater than the preset reference detection threshold, and the second detection threshold may be smaller than the preset reference detection threshold.

In another embodiment, the first determiner 110 may determine the first detection threshold when selecting the first external environment state, determine the second detection threshold when selecting the second external environment state, and determine a third detection threshold when selecting the third external environment state.

Here, the first detection threshold may be greater than the preset reference detection threshold, the second detection threshold may be smaller than the preset reference detection threshold, and the third detection threshold may be equal to the preset reference detection threshold. In other words, the first detection threshold may be greater than the third detection threshold, and the second detection threshold may be smaller than the third detection threshold.

The second determiner 120 can determine whether the radar sensor is blocked based on a result of the detection sensitivity determination performed by the first determiner 110 and signal data of the radar sensor.

Here, the detection sensitivity may include a detection threshold, for example, one or more of the detection threshold described above, and the signal of the radar sensor may include a power value or level of a signal received by the radar sensor.

Thereby, the second determiner 120 can compare the detection threshold determined by the first determiner 110 with the power value of the reception signal of the radar sensor, and determine whether the radar sensor is blocked or unblocked according to a result of the comparison.

That is, the second determiner 120 can determine that the radar sensor is blocked when the power value of the reception signal of the radar sensor is smaller than or equal to the detection threshold determined by the first determiner 110, and can determine that the radar sensor is unblocked when the power value of the reception signal of the radar sensor is greater than the detection threshold determined by the first determiner 110.

In one embodiment, the second determiner 120 can determine that the radar sensor is blocked when the power value of the reception signal of the radar sensor is smaller than or equal to the first detection threshold, and can determine that the radar sensor is unblocked when the power value of the reception signal of the radar sensor is greater than the first detection threshold.

The second determiner 120 can determine that the radar sensor is blocked when the power value of the reception signal of the radar sensor is smaller than or equal to the second detection threshold, and can determine that the radar sensor is unblocked when the power value of the reception signal of the radar sensor is greater than the second detection threshold.

The second determiner 120 can determine that the radar sensor is blocked when the power value of the reception signal of the radar sensor is smaller than or equal to the third detection threshold, and can determine that the radar sensor is unblocked when the power value of the reception signal of the radar sensor is greater than the third detection threshold.

Hereinafter, a method of determining whether a radar sensor is blocked based on at least one of external weather data, external image data, and vehicle status data will be described. It should be understood that the examples or embodiments or the features thereof described above are equally, or substantially equally, applied to the following examples or embodiments, and are omitted for brevity and convenience of description. That is, even when not discussed in the following description, the embodiments or examples or the features thereof described above can be equally applied to or combined into each of the embodiments or examples described below. Any full or partial combination of one or more embodiments or examples herein is also part of the present disclosure.

The first determiner 110 can determine an external environment state of a vehicle or a radar sensor based on at least one of external weather data, external image data, and vehicle status data.

The first determiner 110 can determine whether the external environment of the vehicle or the radar sensor is in the below-zero state based on external temperature data, determine whether the external environment is in the rain state based on external rainfall data, determine whether the external environment is in the rain state and in the snow state based on external image data taken by a camera or an image sensor, and determine whether the external environment is in the rain state and in the snow state based on vehicle wheel slip data.

It should be understood that the method of determining whether the external environment of the vehicle or the radar sensor is in the below-zero state based on the external temperature data and the method of determining whether the external environment is in the rain state based on the external rainfall data as described above are omitted in the following examples or embodiments to which the above embodiments are equally, or substantially equally, applied, for brevity and convenience of description.

In one embodiment, the first determiner 110 can determine that the external environment of a vehicle or a radar sensor is in the rain and/or snow states when rain and/or snow conditions are recognized through the processing of external image data taken by a camera, an image sensor, or the like, and determine that it is in the non-rain and/or non-snow states when rain and/or snow conditions are not recognized.

In another embodiment, through a comparison between the number of vehicle wheel slip occurrences and a preset reference number of wheel slip occurrences, the first determiner 110 can determine that the external environment of the vehicle or the radar sensor is in the rain and/or snow states when the number of vehicle wheel slip occurrences is greater than the preset reference number of wheel slip occurrences, and determine that it is in the non-rain and/or non-snow states when the number of vehicle wheel slip occurrences is smaller than or equal to the preset reference number of wheel slip occurrences.

Here, the number of vehicle wheel slip occurrences may be calculated based on wheel speed data from a speed sensor and acceleration data from an acceleration (G) sensor. That is, the first determiner 110 can compare a differential value of a wheel speed value from the speed sensor with an acceleration value of the acceleration (G) sensor, and calculate vehicle wheel slip data (e.g., the number of vehicle wheel slip occurrences, etc.) according to a result of the comparison.

The first determiner 110 can determine an external environment state of the vehicle or the radar sensor based on results of the determinations on whether the external environment is in the below-zero state, in the rain state, and/or in the snow state.

Specifically, the first determiner 110 can select at least one of a plurality of preset external environmental states based on results of the determination on whether the external environment is in the below-zero state and/or in the rain state.

In one embodiment, the plurality of preset external environment states may include first and second external environment states.

In this case, in a situation where the external environment is in at least one of the below-zero state, the rain state, and the snow state, the first determiner 110 can select the first external environment state. Further, in a situation where the external environment is in the above-zero state and the non-rain state, the first determiner 110 can select the second external environment state.

In another embodiment, the plurality of preset external environment states may further include a third external environment state. That is, the plurality of preset external environment states may include the first to third external environment states.

In this case, in a situation where the external environment is in at least one of the below-zero state, the rain state, and the snow state, the first determiner 110 can select the first external environment state.

Further, while the first determiner 110 is allowed to select one of the second and third external environment states when the external environment is the above-zero state and the non-rain state, the first determiner 110 can select the second external environment state when the external environment is in an above-zero state exceeding a preset temperature value, and select the third external environment state when the external environment is in an above-zero state equal to or smaller than the preset temperature value.

That is, while the first determiner 110 is allowed to select one of the second and third external environment states when the external environment is the above-zero state and the non-rain state, the first determiner 110 can select the second external environment state when an external temperature value is greater than a preset first temperature value and is smaller than or equal to a preset second temperature value, and select the third external environment state when the external temperature value is greater than a preset reference temperature value and smaller than or equal to the preset first temperature value.

It should be understood that the method of determining the detection sensitivity and the method of determining whether the radar sensor is blocked as described above are omitted in the following examples or embodiments to which the above embodiments are equally, or substantially equally, applied, for brevity and convenience of description.

Figure 2:
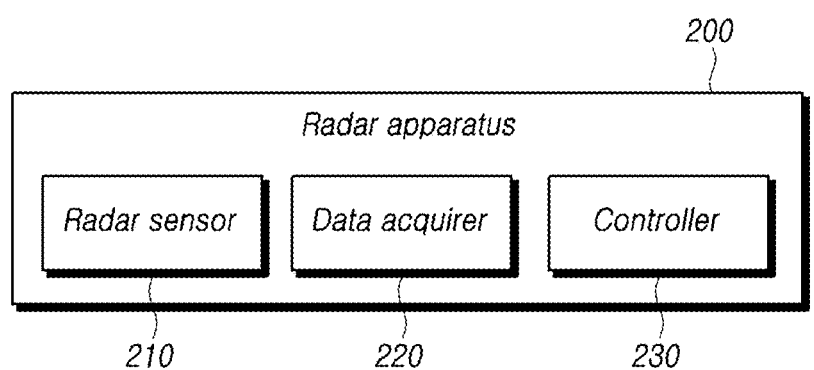
FIG. 2 is a block diagram illustrating a radar apparatus according to aspects of the present disclosure.

FIG. 2 is a block diagram illustrating a radar apparatus according to aspects of the present disclosure.

Referring to FIG. 2, the radar apparatus 200 according to aspects of the present disclosure may include at least one of a radar sensor 210, a data acquirer 220, and a controller 230. The radar sensor 210, the data acquirer 220, and the controller 230 may be connected by at least one of an electrical, magnetic, or mechanical connection.

The radar sensor 210 can transmit and receive radar signals, and generate signal data based thereon. That is, the radar sensor 210 can transmit a radar signal, receive a reflected radar signal from an object, and generate signal data of the radar sensor based on the reflected radar signal.

Here, the signal data of the radar sensor may include a power value of a signal received by the radar sensor 210; however, embodiments of the present disclosure are not limited thereto. For example, any data related to the radar sensor 210 may be included in the signal data of the radar sensor.

The data acquirer 220 can acquire data. In particular, the data acquirer 220 can acquire at least one of external weather data, external image data, and vehicle status data; however, embodiments of the present disclosure are not limited thereto. For example, the data acquirer 220 can acquire any data related to the vehicle.

The controller 230 can determine an external environment state of the vehicle or the radar sensor 210 based on at least one of external weather data, external image data, and vehicle status data, and determine detection sensitivity according to the determined external environmental state, and determine whether the radar sensor is blocked based on the determined detection sensitivity and signal data of the radar sensor.

In one embodiment, the controller 230 can determine whether the radar sensor is blocked based on external weather data outside of the vehicle or the radar sensor 210.

In another embodiment, the controller 230 can determine whether the radar sensor is blocked based on at least one of external weather data, external image data, and vehicle status data.

Since the controller 230 can perform all of the function of the radar sensor blockage detection device 100 described above with reference to FIG. 1, the discussions on all of the function of the radar sensor blockage detection device 100 can be applied to the controller 230.

The controller 230 may include an electronic control unit (ECU); however, embodiments of the present disclosure are not limited thereto. For example, any devices (or systems, etc.) capable of electronically controlling may serve as the controller 230.

Figure 3:
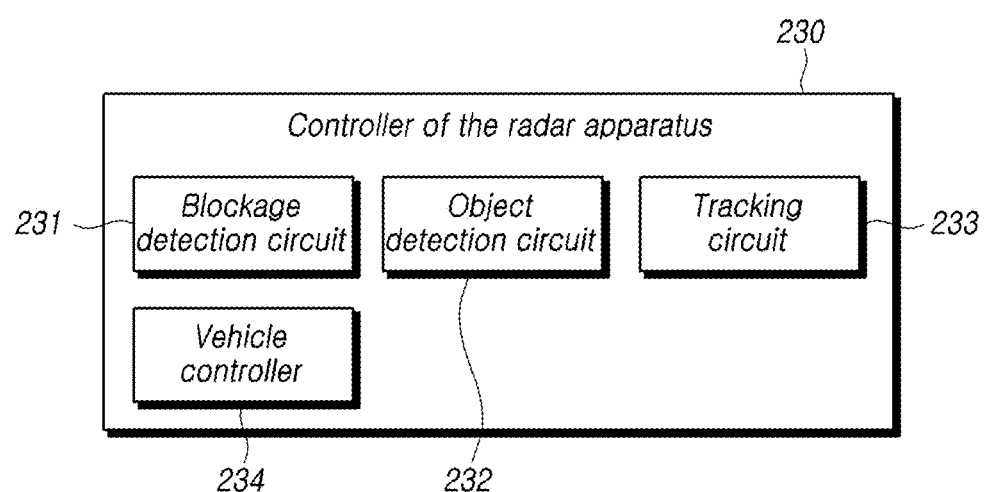
FIG. 3 is a block diagram illustrating a controller of the radar apparatus according to aspects of the present disclosure.

FIG. 3 is a block diagram illustrating the controller 230 of the radar apparatus according to aspects of the present disclosure.

Referring to FIG. 3, the controller 230 of the radar apparatus according to aspects of the present disclosure may include at least one of a blockage detection circuit 231, an object detection circuit 232, a tracking circuit 233, and a vehicle controller 234. The blockage detection circuit 231, the object detection circuit 232, the tracking circuit 233, and the vehicle controller 234 may be connected by at least one of an electrical, magnetic, or mechanical connection.

Since the blockage detection circuit 231 may perform a function, or be a component, substantially equal to the radar sensor blockage detection device 100 described above with reference to FIG. 1, all of the function of the radar sensor blockage detection device 100 described above with reference to FIG. 1 may be applied to the blockage detection circuit 231.

The object detection circuit 232 may detect an object based on signal data of the radar sensor according to a result of the determination of the blockage detection circuit 231 on whether the radar sensor is blocked. For example, when the blockage detection circuit 231 determines that the radar sensor is unblocked, the object detection circuit 232 can detect an object based on signal data of the radar sensor.

The tracking circuit 233 can track the object detected by the object detection circuit 232.

The vehicle controller 234 can control an associated vehicle based on the object tracked by the tracking circuit 233. That is, the vehicle controller 234 can control the operation of the vehicle (e.g., braking and/or steering of the vehicle, etc.) based on the object tracked by the tracking circuit 233. In particular, the vehicle controller 234 can control the operation of the vehicle (e.g., braking and/or steering of the vehicle, etc.) by activating the function of advanced driver assistance systems (ADAS) based on the object tracked by the tracking circuit 233. Here, the ADAS function may include at least one of an advanced emergency brake (AEB) and a smart cruise control (SCC); however, embodiments of the present disclosure are not limited thereto.

On the other hand, when the blockage detection circuit 231 determines that the radar sensor is blocked, the vehicle controller 234 can control the vehicle. That is, when the blockage detection circuit 231 determines that the radar sensor is blocked, the vehicle controller 234 can cause a warning of the radar sensor blockage or a shut-off of the radar sensor to be outputted or performed.

FIGS. 4 to 8 illustrate methods of adjusting a detection threshold based on an external environment state in the radar sensor blockage detection device and/or the radar apparatus according to aspects of the present disclosure.

Figure 4:
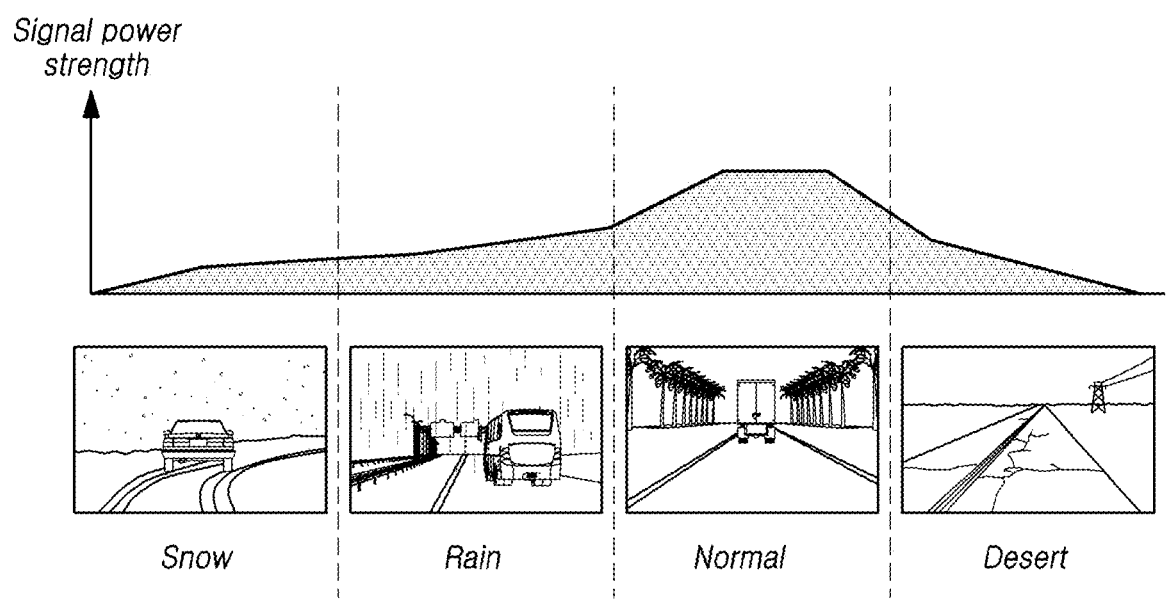
FIGS. 4 to 8 illustrate methods of adjusting a detection threshold based on an external environment state in the radar sensor blockage detection device and/or the radar apparatus according to aspects of the present disclosure.

Referring to FIG. 4, the external environment of a vehicle or a radar sensor may be classified into a snow state, a rain state, a normal state, a desert state, and the like.

In a situation where an external environment is in the snow state and the rain state, due to the blockage of the radar sensor caused by debris or obstructions (e.g., snow, rain, and the like), a power strength (or value) of a signal received by the radar sensor may be smaller than that of a signal received by the radar sensor in a situation where the external environment is in the normal state.

To solve this problem, it is desired to quickly detect a degradation in the performance of the radar sensor in a situation where the external environment is in the snow and/or rain states.

A power strength (or value) of a signal received by the radar sensor in a situation where the external environment is in the desert state may be smaller than that in a situation where the external environment is in the normal state, due to a situation where a track is not detected by the radar sensor.

Here, the power strength (or value) of the reception signal of the radar sensor may refer to a strength of a signal received by the radar sensor after a transmitted signal from a radar has been reflected from an object. Further, as described above, considering that a power strength of reception signals may vary depending on external environment states, according to embodiments of the present disclosure, detection sensitivity criteria or conditions of the radar sensor may be increased or decreased according to a specific external environment of an associated vehicle or the radar sensor.

Accordingly, in the case of the desert external environment, it is desired to prevent a situation where a track is not detected, which occurs normally, from being erroneously regarded as a situation where the radar sensor is blocked.

Therefore, the radar sensor blockage detection device according to aspects of the present embodiments can quickly detect a degradation in the performance of the radar sensor by increasing detection sensitivity in the state of rain and/or snow external environments, and prevent a situation where a track is not normally detected from being erroneously regarded as a situation where the radar sensor is blocked, by decreasing the detection sensitivity in the state of the desert external environment.

Figure 5:
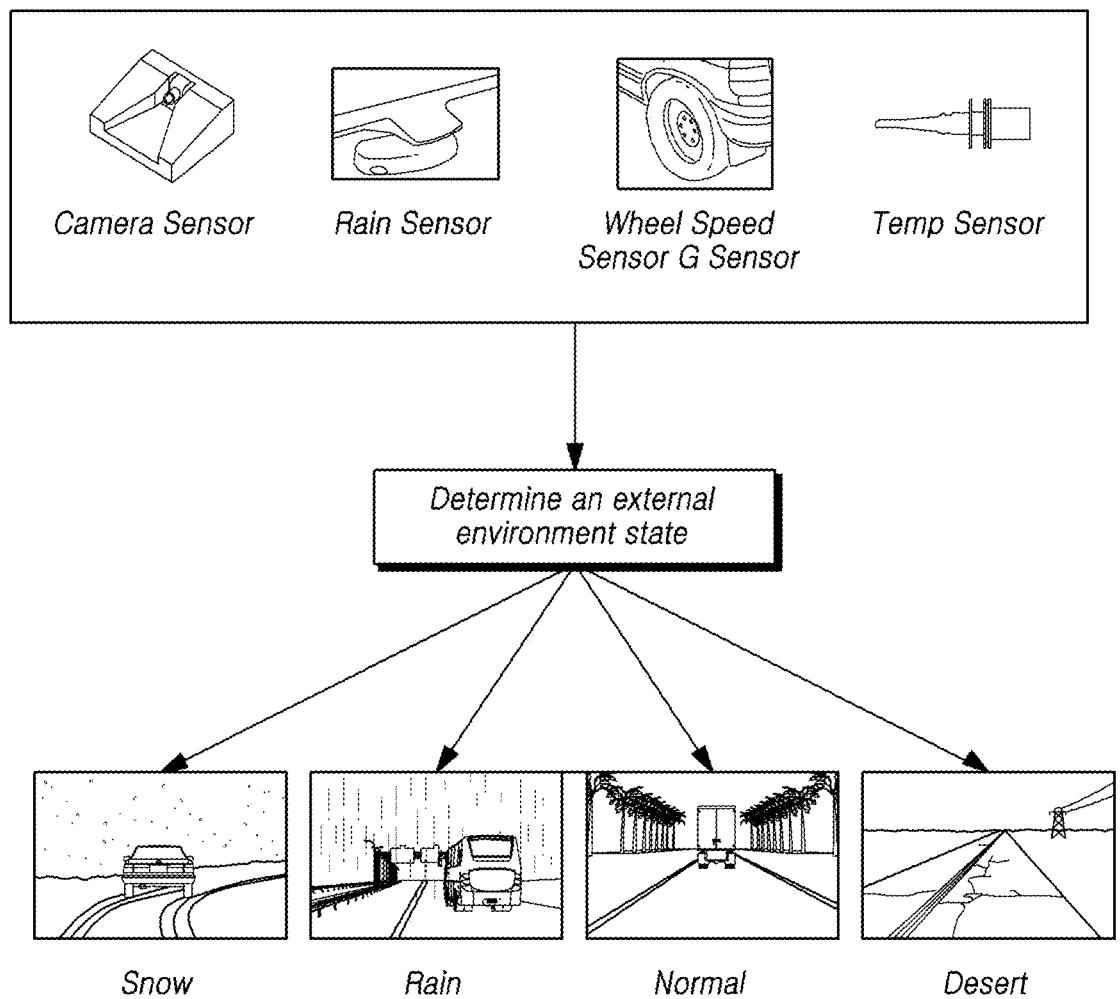

Referring to FIG. 5, the radar sensor blockage detection device according to aspects of the present embodiments can determine whether an external environment of a vehicle or a radar sensor is in the snow state, the rain state, the normal state, and/or the desert state based on sensor data acquired by at least one of sensors, such as a camera or image sensor, a rain sensor, a wheel speed sensor, a G sensor, a temperature sensor, and the like.

For example, the radar sensor blockage detection device can process external image data taken by the camera or image sensor, and when rain or snow is recognized, determine that the external environment is in the rain or snow state. When rain and snow are not recognized, the radar sensor blockage detection device can determine that the external environment is in the non-rain state and non-snow state (e.g., the normal state), and/or the desert state.

Further, through a comparison between an external rainfall value from the rain sensor and a preset reference rainfall value, when the external rainfall value is smaller than or equal to the preset reference rainfall value, the radar sensor blockage detection device can determine that the external environment is in the non-rain state (e.g., the normal state) and/or the desert state, and when the external rainfall value is greater than the preset reference rainfall value, determine that the external environment is in the rain state.

Further, through a comparison between a differential value of a wheel speed value from the wheel speed sensor and an acceleration value from the G sensor, the radar sensor blockage detection device can calculate vehicle wheel slip data (e.g., the number of vehicle wheel slip occurrences, etc.) according to a result of the comparison, compare the number of vehicle wheel slip occurrences with a preset reference number of wheel slip occurrences, determine that the external environment is in the rain and/or snow states when the number of vehicle wheel slip occurrence is greater than the preset reference number of wheel slip occurrences, and determine that the external environment is in the non-rain and/or non-snow states (e.g., the normal state) and/or the desert state etc. when the number of vehicle wheel slip occurrence smaller than or equal to the preset reference number of wheel slip occurrences.

Further, through a comparison between an external temperature value from the temperature sensor and a preset reference temperature value, the radar sensor blockage detection device can determine that the external environment in the below-zero state (e.g., the snow state, etc.) when the external temperature value is less than or equal to the preset reference temperature value, and determine that the external environment in the above-zero state (e.g., the normal state and/or the desert state) when the external temperature value is greater than the preset reference temperature value.

Figure 6:
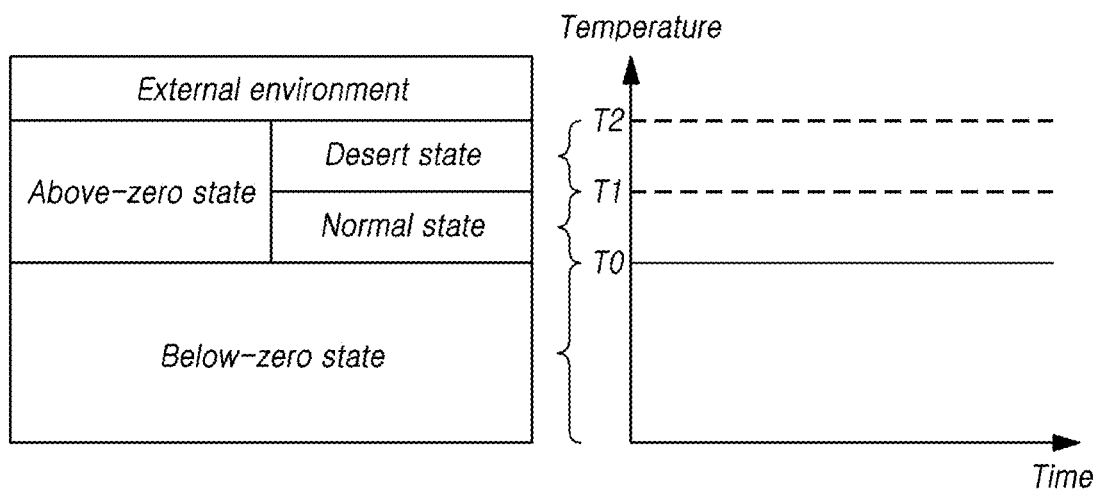

Referring to FIG. 6, the radar sensor blockage detection device can determine that an external environment is in the below-zero state when an external temperature value is smaller than or equal to a preset reference temperature value T0, and determine that the external environment is in the above-zero state when the external temperature value is greater than the preset reference temperature value T0. In particular, when the external temperature value is greater than the preset reference temperature value T0 and is smaller than or equal to a preset first temperature value T1, the radar sensor blockage detection device can determine that the external environment is in the normal state, and when the external temperature value is greater than the preset first temperature value T1 and is smaller than or equal to a preset second temperature value T2, determine that the external environment is in desert state.

Figure 7:
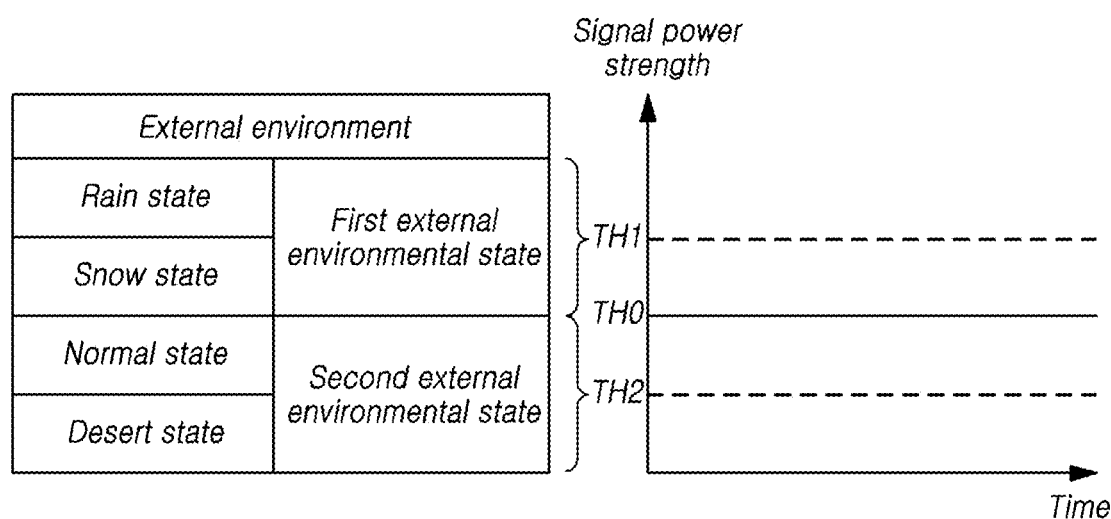

Referring to FIG. 7, a reference detection threshold TH0 may be preset in the radar sensor blockage detection device. While the vehicle is stopped or traveling, the radar sensor blockage detection device can determine that an external environment of the vehicle or the radar sensor is in a first external environmental state or a second environmental state based on sensor data acquired by at least one of sensors, such as the camera or camera sensor, the rain sensor, the wheel speed sensor, the G sensor, the temperature sensor, and the like.

In particular, the first external environment state may include the rain state and the snow state, and the second external environment state may include the normal state and the desert state.

Accordingly, when the radar sensor blockage detection device determines that the external environment is in the rain state and the snow state, a corresponding detection threshold may be increased from the reference detection threshold TH0 to a first detection threshold TH1.

Further, when the radar sensor blockage detection device determines that the external environment is in the normal state and the desert state, the detection threshold may be decreased from the reference detection threshold TH0 to a second detection threshold TH2.

Figure 8:
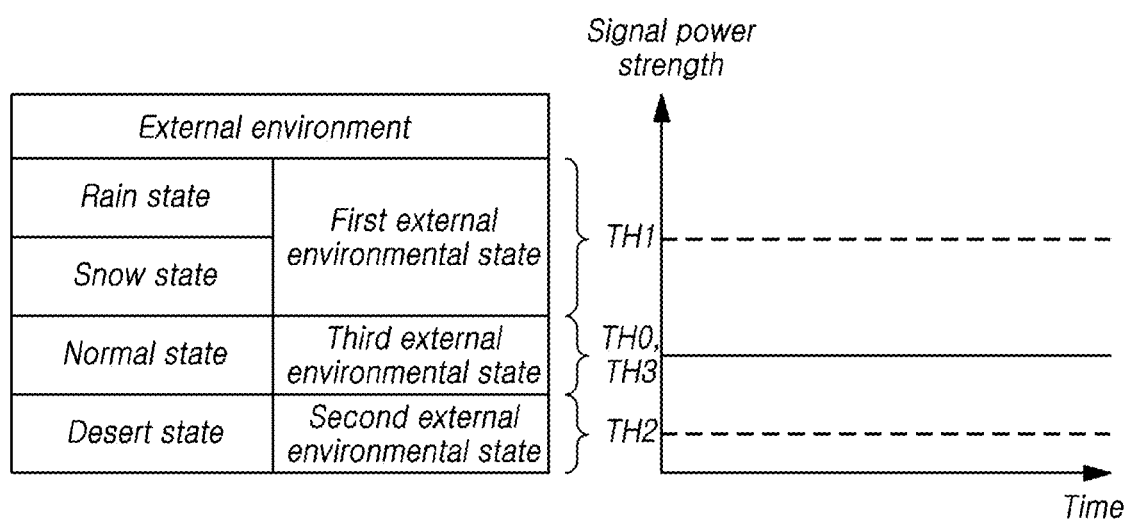

Referring to FIG. 8, a reference detection threshold TH0 may be preset in the radar sensor blockage detection device. While the vehicle is stopped or traveling, the radar sensor blockage detection device can determine that an external environment of the vehicle or the radar sensor is in a first external environmental state, a second external environmental state, or a third external environmental state based on sensor data acquired by at least one of sensors, such as the camera or camera sensor, the rain sensor, the wheel speed sensor, the G sensor, the temperature sensor, and the like.

In particular, the first external environment state may include the rain state and/or the snow state; the second external environment state may include the desert state; and the second external environment state may include the normal state.

Accordingly, when the radar sensor blockage detection device determines that the external environment is in the rain state and the snow state, a corresponding detection threshold may be increased from the reference detection threshold TH0 to a first detection threshold TH1.

Further, when the radar sensor blockage detection device determines that the external environment is in the desert state, the detection threshold may be decreased from the reference detection threshold TH0 to a second detection threshold TH2.

Further, when the radar sensor blockage detection device determines that the external environment is in the normal state, the detection threshold may be determined to be a third detection threshold T3 equal to the reference detection threshold TH0.

As described with reference to FIGS. 6 to 8, the radar sensor blockage detection device according to aspects of the present disclosure can prevent a situation where a received signal has a low reception power strength from being regarded as a situation where the radar sensor is blocked, by decreasing a corresponding detection threshold in the situation where detection sensitivity is needed to be decreased according to external environment states, and adjust the detection sensitivity for enabling a situation where a received signal has a higher reception power strength as compared with a normal situation to be regarded as a situation where the radar sensor is blocked, by increasing the corresponding detection threshold in the situation where the detection sensitivity is needed to be increased.

As described above, the radar sensor blockage detection device according to aspects of the present disclosure can improve the accuracy and reliability of an associated radar apparatus by correcting an unsuccessful detection as to whether a radar sensor is blocked by using environment information (or data) related to the traveling of a vehicle.

Further, the radar sensor blockage detection device according to aspects of the present disclosure can improve the accuracy and reliability of the radar apparatus by determining whether the radar sensor is blocked by debris or obstructions, and based on this, limiting the operating of the radar sensor or the using of data from the radar sensor in a situation where an associated vehicle system cannot normally operate.

Specifically, in a situation where snow accumulates on a cover of a forward-looking radar apparatus during snowfall, it is desired to quickly detect a degradation in the performance of the radar sensor. However, in the event that the performance of the radar sensor is simply sensitively detected, there is a probability that a situation where a track is not normally detected in an open land such as a desert area etc. is erroneously regarded as a situation where the radar sensor is blocked.

Thus, in the radar sensor blockage detection device according to aspects of the present disclosure, after determining whether an external environment is in a below-zero situation and/or in a rain situation, in which the blockage of the radar sensor may occur with a substantially higher probability, by increasing detection sensitivity when it is determined that the external environment is in the below-zero situation and/or in the rain situation, and decreasing the detection sensitivity in one or more other situations, such as a normal situation, except for the below-zero situation and the rain situation, that is, by selectively increasing the detection sensitivity only in a situation or condition where the blockage of the radar sensor may occur environmentally, it is possible to improve the accuracy and reliability of the radar apparatus as an erroneous detection or a sensitive detection in the normal situation except for the below-zero situation and the rain situation can be reduced.

Figure 9:
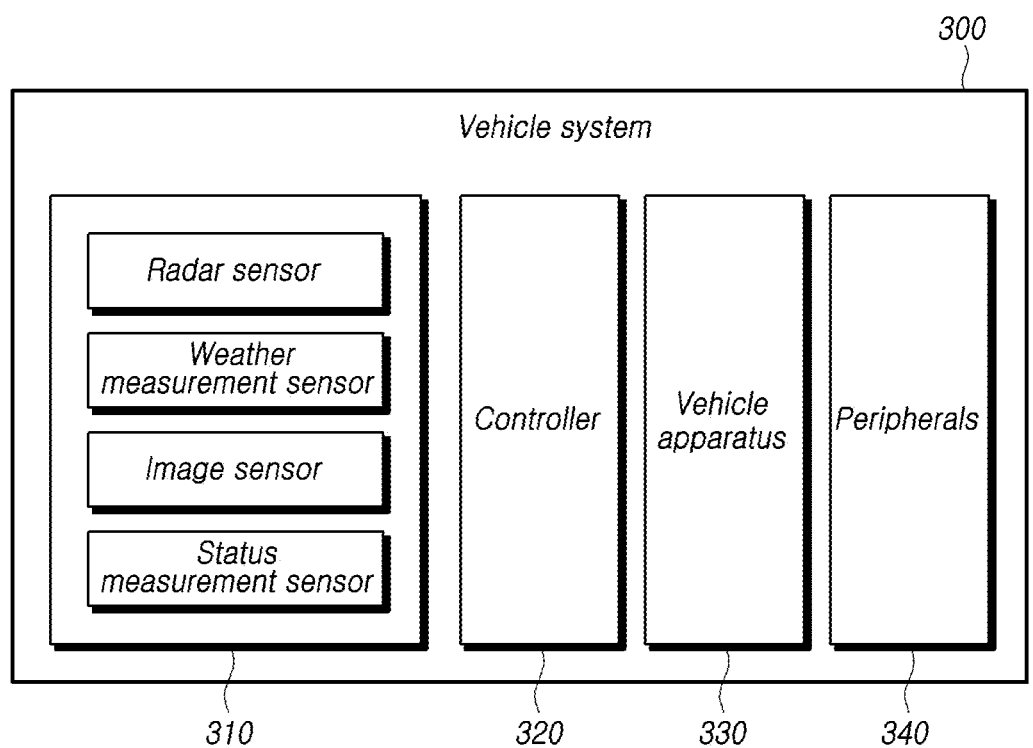
FIG. 9 illustrates a vehicle system according to aspects of the present disclosure.

FIG. 9 illustrates a vehicle system according to aspects of the present disclosure.

Referring to FIG. 9, the vehicle system 300 according to aspects of the present disclosure may include a sensor 310, a controller 320, a vehicle apparatus 330, and peripherals 340. The sensor 310, the controller 320, the vehicle apparatus 330, and the peripherals 340 may be connected by at least one of an electrical, magnetic, or mechanical connection.

The sensor 310 may include at least one of a radar sensor for transmitting and receiving a radar signal, a weather measurement sensor for measuring an external weather state of the vehicle or the radar sensor, an image sensor for capturing an external environment of the vehicle or the radar sensor, and a status measurement sensor for measuring a status of the vehicle.

Since the radar sensor has been described above, discussions on the radar sensor will be omitted for brevity and convenience of description.

The weather measurement sensor can acquire external weather data by measuring an external weather state or condition outside of the vehicle or the radar sensor. The weather measurement sensor may include a rain sensor, a snow sensor, and a temperature sensor; however, embodiments of the present disclosure are not limited thereto. For example, any sensors capable of acquiring a weather state or condition outside of the vehicle or the radar sensor may be included in the weather measurement sensor.

The rain sensor can acquire external rainfall data by measuring an external rain state or condition outside of the vehicle or the radar sensor. The temperature sensor can acquire external temperature data by measuring an external temperature state or condition outside of the vehicle or the radar sensor.

The image sensor can acquire external image data by capturing an external environment of the vehicle or the radar sensor. The image sensor may include a camera sensor, and the like; however, embodiments of the present disclosure are not limited thereto. For example, any sensors capable of acquiring image data outside of the vehicle or the radar sensor may be included in the image sensor.

The status measurement sensor can acquire vehicle status data by measuring a status of the vehicle. The status measurement sensor may include at least one of a speed sensor (e.g., a vehicle wheel speed sensor, etc.) and an acceleration (G) sensor; however, embodiments of the present disclosure are not limited thereto. For example, any sensors capable of acquiring vehicle status data may be included in the status measurement sensor. In particular, the speed sensor may include a vehicle wheel speed sensor.

The controller 320 can determine an external environment state of the vehicle or the radar sensor based on at least one of external weather data from the weather measurement sensor, external image data from the camera sensor, and vehicle status data from the status measurement sensor, determine detection sensitivity according to the determined external environment state, determine whether the radar sensor is blocked based on a result of the determined detection sensitivity and the signal data of the radar sensor, and control the vehicle apparatus 330 or the peripherals 340 according to a result of the determination for whether the radar sensor is blocked.

Since the controller 320 can perform the functions of both the radar sensor blockage detection device 100 and the controller 230 of the radar apparatus described above, the discussions on all of the functions of the radar sensor blockage detection device 100 and the controller 230 of the radar apparatus can be applied to the controller 320.

The controller 320 may include an electronic control unit (ECU); however, embodiments of the present disclosure are not limited thereto. For example, any devices (or systems, etc.) capable of electronically controlling may serve as the controller 320.

The operation of the vehicle apparatus 330 can be controlled by the controller 320. The vehicle apparatus 330 may include at least one of a power generating device, a power transmitting device, a suspension device, a steering device, a braking device, and an electric device; however, embodiments of the present disclosure are not limited thereto. For example, any devices related to the vehicle may be included in the vehicle apparatus 330.

For example, when it is determined that the radar sensor is unblocked, the controller 320 can detect an object based on signal data of the radar sensor, and by activating the ADAS function based on this, control at least one of the steering device and the braking device of the vehicle apparatus 330.

The operation of the peripherals 340 can be controlled by the controller 320. For example, when it is determined that the radar sensor is blocked, the controller 320 can control the peripherals 340 to generate or provide the blockage (or obstruction) warning of the radar sensor.

The peripherals 340 are employed for generating or providing visual, auditory and/or tactile signals, and therefore, may include a display, a sound output module such as a speaker, a microphone, an alarm, etc., or a haptic module such as a spinning motor, a servo motor, a piezoelectric motor, a vibrator, etc. In one embodiment, as one of the peripherals 340, the display can output or display characters or symbols representing a warning of the radar sensor blockage (or obstruction). In another embodiment, as one of the peripherals 340, the speaker can output voice, sound, etc. representing a warning of the radar sensor blockage (or obstruction). In further another embodiment, as one of the peripherals 340, the vibrator can output a vibration of a specific frequency representing a warning of the radar sensor blockage (or obstruction) to an associated steering wheel, etc.

Hereinafter, a vehicle control method based on a radar sensor according to aspects of the present disclosure will be described with reference to accompanying drawings. The radar sensor-based vehicle control method according to aspects of the present disclosure can be performed using the radar sensor blockage detection device, the radar apparatus, and the vehicle system. Thus, the discussions on the radar sensor blockage detection device, the radar apparatus, and the vehicle system described above with reference to FIGS. 1 to 9 will be omitted in the following discussions related to the radar sensor-based vehicle control method for brevity and convenience of description.

Figure 10:
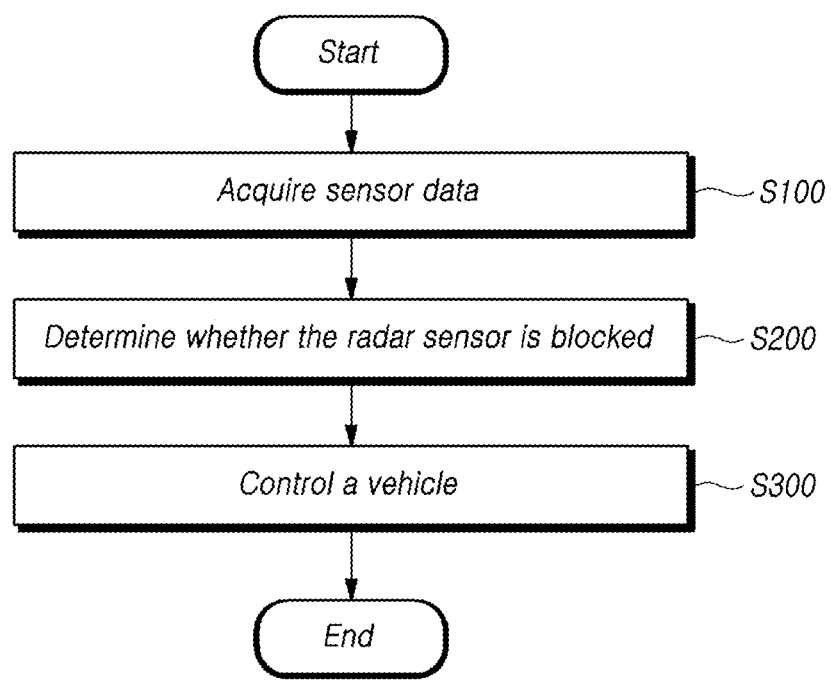
FIG. 10 is a flow sequence for explaining a vehicle control method based on a radar sensor according to aspects of the present disclosure.

FIG. 10 is a flow sequence for explaining the radar sensor-based vehicle control method according to aspects of the present disclosure.

Referring to FIG. 10, the radar sensor-based vehicle control method according to aspects of the present disclosure may include at least one of a sensor data acquisition step S100, a radar sensor blockage detection step S200, and a vehicle control step S300.

Sensor data can be acquired through at least one sensor, at step S100.

For example, in step S100, at least one of signal data of the radar sensor through the radar sensor, external weather data outside of a vehicle or the radar sensor through the weather measurement sensor, external image data outside of the vehicle or the radar sensor through the image sensor, and vehicle status data through the status measurement sensor can be acquired.

Thereafter, whether the radar sensor is blocked can be determined based on the sensor data, at step S200.

In step 200, an external environment state of the vehicle or the radar sensor 210 can be determined based on at least one of the external weather data, the external image data, and the vehicle status data; detection sensitivity can be determined according to the determined external environmental state; and whether the radar sensor is blocked can be determined based on the determined detection sensitivity and signal data of the radar sensor.

Thereafter, the vehicle can controlled according to a result of the determination on whether the radar sensor is blocked, at step S300.

For example, in step S300, when it is determined that the radar sensor is unblocked, an object can be detected based on the signal data of the radar sensor, and based on this, the steering and/or braking of the vehicle can be controlled through the activation of the ADAS function.

Further, in step S300, when it is determined that the radar sensor is blocked, a warning of the radar sensor blockage or a shut-off of the radar sensor can be outputted or performed.

Figure 11:
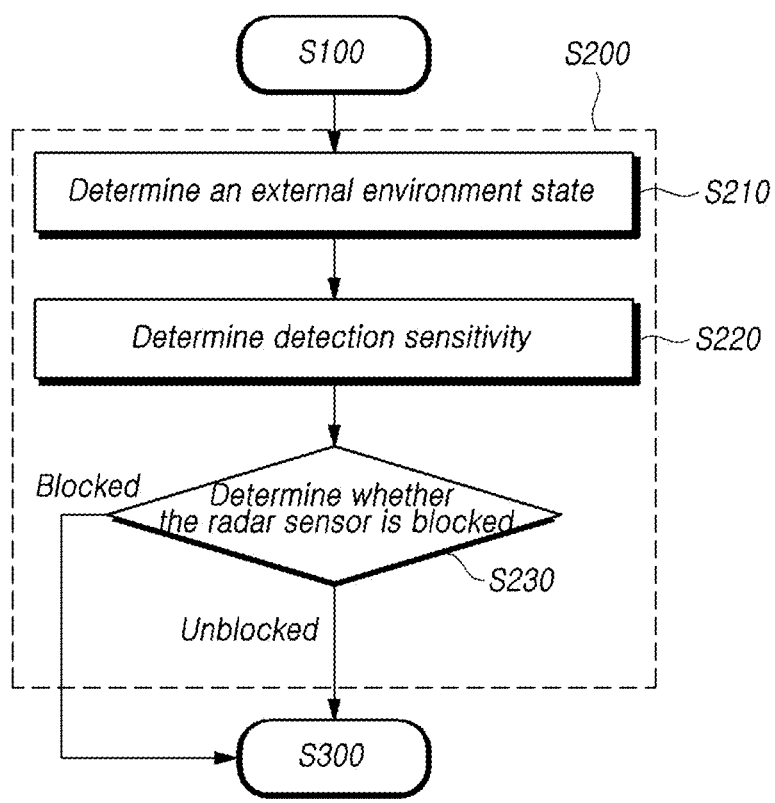
FIG. 11 is a flow chart for explaining a method of detecting the blockage of a radar sensor according to aspects of the present disclosure.

FIG. 11 is a flow chart for explaining a method of detecting the blockage of the radar sensor according to aspects of the present disclosure.

Referring to FIG. 11, the method of detecting the blockage of the radar sensor ("radar sensor blockage detection method") according to aspects of the present disclosure can include at least one of an external environment state determination step S210, a detection sensitivity determination step S220, and a radar sensor blockage-related determination step S230.

Hereinafter, the method of determining whether the radar sensor is blocked based on external weather data outside of a vehicle or the radar sensor will be described.

An external environment state outside of the vehicle or the radar sensor can be determined based on external weather data outside of the vehicle or the radar sensor, at step S210.

In step S210, whether an external environment is in the below-zero state can be determined based on external temperature data, and whether the external environment is in the rain state can be determined based on external rainfall data.

In one embodiment, through a comparison between an external temperature value with a preset reference temperature value, the external environment can be determined to be in the below-zero state when the external temperature value is smaller than or equal to the preset reference temperature value, and be determined to be in the above-zero state when the external temperature value is greater than the preset reference temperature value.

In another embodiment, through a comparison between an external rainfall value with a preset reference rainfall value, the external environment can be determined to be in non-rain state when the external rainfall value is smaller than or equal to the preset reference rainfall value, and be determined to be in the rain state when the external rainfall value is greater than the preset reference rainfall value.

Thereafter, in step S210, the external environment state of the vehicle or the radar sensor can be determined based on a result of the determination on whether the external environment is in the below-zero state and/or in the rain state.

Specifically, at least one of a plurality of preset external environmental states can be selected based on the result of the determination on whether the external environment is in the below-zero state and/or in the rain state.

In one embodiment, the plurality of preset external environment states may include first and second external environment states.

In this case, the first external environment state can be selected in a situation where the external environment is in at least one of the below-zero state and the rain state. Further, the second external environment state can be selected in a situation where the external environment is in the above-zero state and the non-rain state.

In another embodiment, the plurality of preset external environment states may further include a third external environment state. That is, the plurality of preset external environment states may include the first to third external environment states.

Thus, the first external environment state can be selected in a situation where the external environment is in the below-zero state and the rain state.

Further, while one of the second and third external environment states can be selected when the external environment is in the above-zero state and the non-rain state, the second external environment state can be selected when the external environment is in an above-zero state exceeding a preset temperature value, and the third external environment state can be selected when the external environment is in an above-zero state equal to or smaller than the preset temperature value.

That is, while one of the second and third external environment states can be selected when the external environment is in the above-zero state and the non-rain state, the second external environment state can be selected when an external temperature value is greater than a preset first temperature value and is smaller than or equal to a preset second temperature value, and the third external environment state can be selected when the external temperature value is greater than the preset reference temperature value and smaller than or equal to the preset first temperature value.

Thereafter, detection sensitivity can be determined according to a result of the determination on the external environment state, at step S220.

In one embodiment, a first detection threshold can be determined when the first external environment state is selected, and a second detection threshold can be determined when the second external environment state is selected.

In another embodiment, the first detection threshold can be determined when the first external environment state is selected; the second detection threshold can be determined when the second external environment state is selected; and a third detection threshold can be determined when the third external environment state is selected.

Thereafter, whether the radar sensor is blocked can be determined based on a result of the detection sensitivity determination and signal data of the radar sensor, at step S230.

Thereby, a comparison between a determined detection threshold and a power value of the reception signal of the radar sensor can be performed, and whether the radar sensor is blocked or unblocked can be determined according to a result of the comparison.

That is, determining that the radar sensor is blocked can be performed when the power value of the reception signal of the radar sensor is smaller than or equal to the determined detection threshold, and determining that the radar sensor is unblocked can be performed when the power value of the reception signal of the radar sensor is greater than the determined detection threshold.

In one embodiment, determining that the radar sensor is blocked can be performed when the power value of the reception signal of the radar sensor is smaller than or equal to the first detection threshold, and determining that the radar sensor is unblocked can be performed when the power value of the reception signal of the radar sensor is greater than the first detection threshold.

Determining that the radar sensor is blocked can be performed when the power value of the reception signal of the radar sensor is smaller than or equal to the second detection threshold, and determining that the radar sensor is unblocked can be performed when the power value of the reception signal of the radar sensor is greater than the second detection threshold.

Determining that the radar sensor is blocked can be performed when the power value of the reception signal of the radar sensor is smaller than or equal to the third detection threshold, and determining that the radar sensor is unblocked can be performed when the power value of the reception signal of the radar sensor is greater than the third detection threshold.

Hereinafter, a method of determining whether the radar sensor is blocked based on at least one of external weather data, external image data, and vehicle status data will be described.

An external environment state of a vehicle or the radar sensor can be determined based on at least one of external weather data, external image data, and vehicle status data, at step S210.

That is, in step S210, whether an external environment of the vehicle or the radar sensor is in the below-zero state can be determined based on external temperature data; whether the external environment is in the rain state can be determined based on external rainfall data; whether the external environment is in the rain state and in the snow state can be determined based on external image data taken by a camera or an image sensor; and whether the external environment is in the rain state and in the snow state can be determined based on vehicle wheel slip data.

It should be understood that the method of determining whether the external environment of the vehicle or the radar sensor is in the below-zero state based on the external temperature data and the method of determining whether the external environment is in the rain state based on the external rainfall data as described above are omitted in the following examples or embodiments to which the above embodiments are equally, or substantially equally, applied, for brevity and convenience of description.

In one embodiment, through the processing of external image data taken by a camera, an image sensor, etc., determining that the external environment is in the rain and/or snow states can be performed when rain and/or snow conditions are recognized, and determining that the external environment is in the non-rain and/or non-snow states can be performed when rain and/or snow conditions are not recognized.

In another embodiment, through a comparison between the number of vehicle wheel slip occurrences and a preset reference number of wheel slip occurrences, determining that the external environment is in the rain and/or snow states can be performed when the number of vehicle wheel slip occurrences is greater than the preset reference number of wheel slip occurrences, and determining that the external environment is in the non-rain and/or non-snow states can be performed when the number of vehicle wheel slip occurrences is smaller than or equal to the preset reference number of wheel slip occurrences.

Thereafter, in step S210, the external environment state of the vehicle or the radar sensor can be determined based on a result of the determination on whether the external environment is in the below-zero state, in the rain state, and/or in the snow state.

Specifically, at least one of a plurality of preset external environmental states can be selected based on a result of the determination on whether the external environment is in the below-zero state and/or in the rain state.

In one embodiment, the plurality of preset external environment states may include first and second external environment states.

In this case, the first external environment state can be selected in a situation where the external environment is in at least one of the below-zero state, the rain state, and the snow state. Further, the second external environment state can be selected in a situation where the external environment is in the above-zero state and the non-rain state.

In another embodiment, the plurality of preset external environment states may further include a third external environment state. That is, the plurality of preset external environment states may include the first to third external environment states.

In this case, the first external environment state can be selected in a situation where the external environment is in at least one of the below-zero state, the rain state, and the snow state.

Further, while one of the second and third external environment states can be selected when the external environment is the above-zero state and the non-rain state, the second external environment state can be selected when the external environment is in an above-zero state exceeding a preset temperature value, and the third external environment state can be selected when the external environment is in an above-zero state equal to or smaller than the preset temperature value.

That is, while one of the second and third external environment states can be selected when the external environment is the above-zero state and the non-rain state, the second external environment state can be selected when an external temperature value is greater than a preset first temperature value and is smaller than or equal to a preset second temperature value, and the third external environment state can be selected when the external temperature value is greater than a preset reference temperature value and smaller than or equal to the preset first temperature value.

It should be understood that the method of determining the detection sensitivity and the method of determining whether the radar sensor is blocked as described above are omitted in the following examples or embodiments to which the above embodiments are equally, or substantially equally, applied, for brevity and convenience of description.

Figure 12:
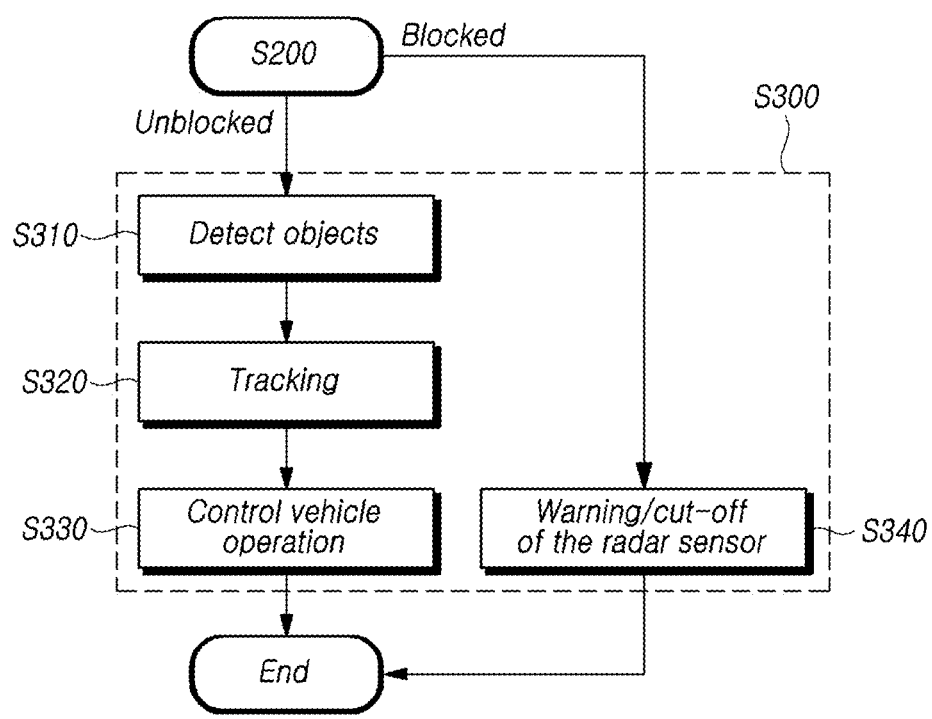
FIG. 12 is a flow sequence for explaining a vehicle control method according to aspects of the present disclosure.

FIG. 12 is a flow sequence for explaining a vehicle control method according to aspects of the present disclosure.

Referring to FIG. 12, the vehicle control method according to aspects of the present disclosure may include at least one of an object detecting step S310, a tracking step S320, a vehicle operation control step S330, and a warning/radar sensor shut-off step S340.

When it is determined that the radar sensor is unblocked, an object can be detected based on signal data of the radar sensor, as step S310.

Thereafter, tracking for the detected object can be performed, at step S320.

Further, operation of the vehicle can be controlled (e.g., braking and/or steering of the vehicle, etc.) based on the tracked object, at step S330. In particular, in step S330, the operation of the vehicle (e.g., braking and/or steering of the vehicle etc.) can be controlled by activating the ADAS function based on the tracked object.

In this regard, when it is determined that the radar sensor is blocked, a warning of the radar sensor blockage or a shut-off of the radar sensor can be outputted or performed.

Figure 13:
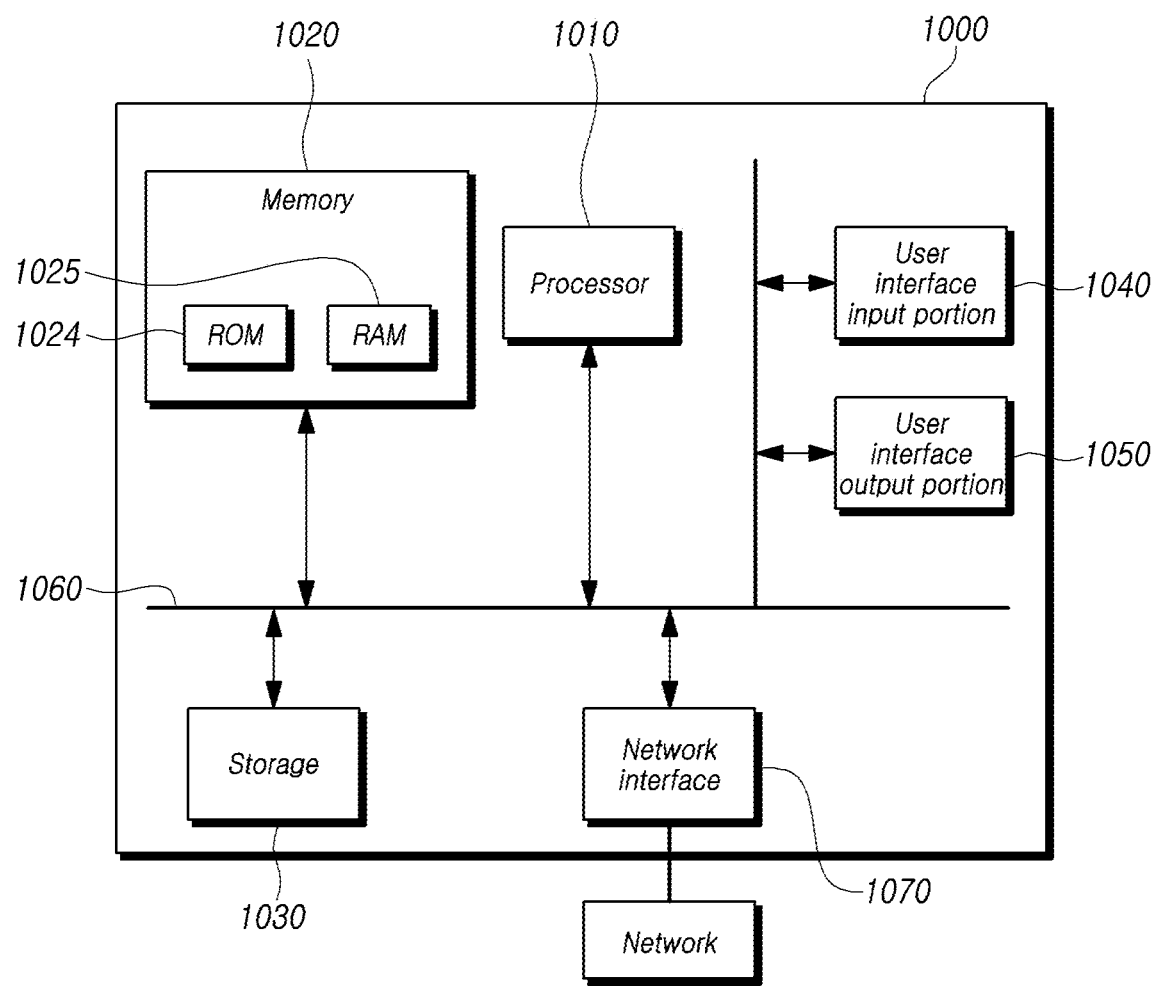
FIG. 13 is a block diagram illustrating a computer system implementing functions of the radar sensor blockage detection device, the radar apparatus, and the vehicle system according to aspects of the present disclosure.

FIG. 13 is a block diagram illustrating a computer system implementing functions of the radar sensor blockage detection device, the radar apparatus, and the vehicle system according to aspects of the present disclosure.

Referring to FIG. 13, the embodiments described above may be implemented in the computer system, for example, in a computer-readable storage medium. As shown in FIG. 13, the computer system 1000 implementing functions of the radar sensor blockage detection device, the radar apparatus, and the vehicle system may include at least one of one or more processors 1010, a memory 1020, a storage 1030, and a user interface input portion 1040, a user interface output portion 1050, and the like, which can communicate with one another via buses 1060. Further, the computer system 1000 may also include a network interface 1070 for accessing a network. The processor 1010 may be a CPU or a semiconductor device for executing processing instructions stored in the memory 1020 and/or the storage 1030. The memory 1020 and the storage 1030 may include various types of volatile/non-volatile storage media. For example, the memory may include ROM 1024 and RAM 1025.

Accordingly, the embodiments described herein may be implemented in a computer-implemented method or with one or more non-volatile computer-readable media in which computer-executable instructions are stored. When executed by a processor, these instructions can perform the at least one method according to the at least one of the embodiments described herein.

What is claimed is:

1. A device of detecting blockage of a radar sensor, the device comprising:
   a first electronic control unit arranged for determining an external environment state outside of a vehicle or the radar sensor based on at least one of external weather data, external image data, and vehicle status data, and determining a detection sensitivity of the radar sensor according to the determined external environment state; and
   a second electronic control unit arranged for determining whether the radar sensor is blocked based on a comparison between a detection threshold for the determined detection sensitivity, determined by the first electronic control unit while the vehicle is travelling, and a power value of reception signal of the radar sensor.

2. The device according to claim 1, wherein the external weather data include at least one of external temperature data, external rainfall data, and external snowfall data, wherein the external image data include external image data taken by a camera or an image sensor, and wherein the vehicle status data include vehicle wheel slip data.

3. The device according to claim 2, wherein the first electronic control unit is arranged to determine whether the external environment state of the vehicle or the radar sensor is in a below-zero state based on the external temperature data, determine whether the external environment state is in a rain state based on the external rainfall data, determine whether the external environment state is in the rain state and in a snow state based on the external image data taken by the camera or the image sensor, determine whether the external environment state is in the rain state and in the snow state based on the vehicle wheel slip data, and determine the external environment state based on results of the determinations for whether the external environment state is in the below-zero state, in the rain state, and in the snow state.

4. The device according to claim 3, wherein the first electronic control unit is arranged to select at least one of a plurality of preset external environmental states based on the results of the determinations for whether the external environment state is in the below-zero state, in the rain state, and in the snow state.

5. The device according to claim 4, wherein the plurality of preset external environment states include first and second external environment states, and wherein the first electronic control unit is arranged to select selects the first external environment state in a situation where the external environment state is in at least one of the below-zero state, the rain state, and the snow state, and selects the second external environment state in a situation where the external environment state is in an above-zero state and a non-rain state.

6. The device according to claim 5, wherein the plurality of preset external environment states further include a third external environment state, and wherein while the first electronic control unit is arranged to allow selecting one of the second and third external environment states when the external environment state is in the above-zero state and the non-rain state, the first electronic control unit is arranged to select the second external environment state when the external environment state is in an above-zero state exceeding a preset temperature value, and selects the third external environment state when the external environment state is in an above-zero state equal to or smaller than the preset temperature value.

7. The device according to claim 1, wherein the first electronic control unit is arranged to determine the detection threshold according to the determined external environment state.

8. The device according to claim 7, wherein the first electronic control unit is arranged to determine a first detection threshold when a first external environment state is selected, and determines a second detection threshold when a second external environment state is selected, and wherein the first detection threshold is greater than a preset reference detection threshold, and the second detection threshold is smaller than the preset reference detection threshold.

9. The device according to claim 7, wherein the first electronic control unit is arranged to determine a first detection threshold when a first external environment state is selected, determines a second detection threshold when a second external environment state is selected, and determines a third detection threshold when a third external environment state is selected, and wherein the first detection threshold is greater than a preset reference detection threshold, the second detection threshold is smaller than the preset reference detection threshold, and the third detection threshold is equal to the preset reference detection threshold.

10. The device according to claim 7, wherein the second electronic control unit is arranged to compare the detection threshold determined by the first electronic control unit with the power value of the reception signal of the radar sensor, and determines whether the radar sensor is blocked or unblocked according to a result of the comparison.

11. The device according to claim 10, wherein the second electronic control unit is arranged to determine that the radar sensor is blocked when the power value of the reception signal of the radar sensor is smaller than or equal to the determined detection threshold, and determines that the radar sensor is unblocked when the power value of the reception signal of the radar sensor is greater than the determined detection threshold.

12. The device according to claim 8, wherein the second electronic control unit is arranged to determine that the radar sensor is blocked when a power value of a reception signal of the radar sensor is smaller than or equal to the first detection threshold, determines that the radar sensor is unblocked when the power value of the reception signal of the radar sensor is greater than the first detection threshold, determines that the radar sensor is blocked when the power value of the reception signal of the radar sensor is smaller than or equal to the second detection threshold, and determines that the radar sensor is unblocked when the power value of the reception signal of the radar sensor is greater than the second detection threshold.

13. The device according to claim 9, wherein the second electronic control unit is arranged to determine that the radar sensor is blocked when a power value of a reception signal of the radar sensor is smaller than or equal to the first detection threshold, determines that the radar sensor is unblocked when the power value of the reception signal of the radar sensor is greater than the first detection threshold, determines that the radar sensor is blocked when the power value of the reception signal of the radar sensor is smaller than or equal to the second detection threshold, determines that the radar sensor is unblocked when the power value of the reception signal of the radar sensor is greater than the second detection threshold, determines that the radar sensor is blocked when the power value of the reception signal of the radar sensor is smaller than or equal to the third detection threshold, and determines that the radar sensor is unblocked when the power value of the reception signal of the radar sensor is greater than the third detection threshold.

14. A method of detecting blockage of a radar sensor, the method comprising: determine an external environment state outside of a vehicle or the radar sensor based on at least one of external weather data, external image data, and vehicle status data; determining a detection sensitivity of the radar sensor according to the determined external environment state; and determining whether the radar sensor is blocked based on a comparison between a detection threshold for the determined detection sensitivity, determined by the first electronic control unit while the vehicle is travelling, and a power value of reception signal of the radar sensor.

15. A radar apparatus comprising: a radar sensor for transmitting and receiving a radar signal; a data acquirer for acquiring at least one of external weather data, external image data, and vehicle status data; and a controller for determining an external environment state of a vehicle or a radar sensor based on the at least one of the external weather data, the external image data, and the vehicle status data, determining a detection sensitivity of the radar sensor according to the determined external environment state, and determining whether the radar sensor is blocked based on a comparison between a detection threshold for the determined detection sensitivity, determined by the first electronic control unit while the vehicle is travelling, and a power value of reception signal of the radar sensor.

16. The device of claim 1, arranged to distinguish a situation where a received radar signal has a low reception power strength but the radar sensor is not blocked, where a detection threshold of the radar sensor must be decreased, from a situation distinguish a situation where a received radar signal has a low reception power strength and the radar sensor is blocked, where a detection threshold of the radar sensor must be increased.

17. The method of claim 14, further comprising the step of distinguishing a situation where a received radar signal has a low reception power strength but the radar sensor is not blocked, where a detection threshold of the radar sensor must be decreased, from a situation distinguish a situation where a received radar signal has a low reception power strength and the radar sensor is blocked, where a detection threshold of the radar sensor must be increased.

18. The radar apparatus of claim 15, arranged to distinguish a situation where a received radar signal has a low reception power strength but the radar sensor is not blocked, where a detection threshold of the radar sensor must be decreased, from a situation distinguish a situation where a received radar signal has a low reception power strength and the radar sensor is blocked, where a detection threshold of the radar sensor must be increased.

* * * * *